US010472942B2

(12) United States Patent
Ben-Zvi et al.

(10) Patent No.: US 10,472,942 B2
(45) Date of Patent: Nov. 12, 2019

(54) BLOWDOWN PRESSURE MAINTENANCE WITH FOAM

(71) Applicants: CONOCOPHILLIPS COMPANY, Houston, TX (US); Cenovus Energy Inc., Calgary (CA)

(72) Inventors: Amos Ben-Zvi, Calgary (CA); Jason Abbate, Calgary (CA); Thomas J. Wheeler, Houston, TX (US); Siluni L. Gamage, Katy, TX (US); Harbir Chhina, Calgary (CA); Alexander E. Filstein, Calgary (CA); Brent D. Seib, Calgary (CA)

(73) Assignees: ConocoPhillips Company, Houston, TX (US); Cenovus Energy, Inc., Calgary (CA)

( * ) Notice: Subject to any disclaimer, the term of this patent is extended or adjusted under 35 U.S.C. 154(b) by 0 days.

(21) Appl. No.: 15/625,493

(22) Filed: Jun. 16, 2017

(65) Prior Publication Data
US 2018/0216449 A1 Aug. 2, 2018

Related U.S. Application Data

(60) Provisional application No. 62/350,783, filed on Jun. 16, 2016.

(51) Int. Cl.
E21B 43/24 (2006.01)
C09K 8/594 (2006.01)
(Continued)

(52) U.S. Cl.
CPC .......... *E21B 43/2408* (2013.01); *C09K 8/594* (2013.01); *E21B 43/168* (2013.01); *E21B 43/18* (2013.01)

(58) Field of Classification Search
CPC ..... E21B 43/2408; E21B 43/18; E21B 43/168
See application file for complete search history.

(56) References Cited

U.S. PATENT DOCUMENTS 3,241,614 A * 3/1966 Bertness ................ C09K 8/524
166/304
4,344,485 A 8/1982 Butler
(Continued)

OTHER PUBLICATIONS

R. M. Butler, et al., "The Gravity Drainage of Steam-heated Heavy Oil to Parallel Horizontal Wells," Petroleum Society of Canada. doi:10.2118/81-02-07 (1981).
(Continued)

*Primary Examiner* — Angela M DiTrani Leff
(74) *Attorney, Agent, or Firm* — Boulware & Valoir

(57) ABSTRACT

A method and system in which foams are used (instead of, or in addition to, NCG) to maintain pressure in a mature chamber during blowdown operations of a SAGD process or other enhanced oil recovery process. The foam occupies the depleted void space within the mature chamber after injection ceases, maintaining pressure, and improving blowdown performance. This use of the foam in the method and system also improves the performance of less mature chambers that are being operated at higher pressure adjacent to the mature chamber in blowdown. Foaming agents, such as metal carbonates, bicarbonates, and hydroxides, surfactants or any other colloidal foams, aerosols, hydrosols, emulsions or dispersions can be utilized. The method and system can be utilized in conjunction with other known art, such as heat scavenging in the chamber, or enhanced oil recovery utilizing foams, to displace oil in the chamber.

30 Claims, 9 Drawing Sheets

(51) Int. Cl.
*E21B 43/16* (2006.01)
*E21B 43/18* (2006.01)

(56) References Cited

U.S. PATENT DOCUMENTS

| | | | | |
|---|---|---|---|---|
| 4,601,337 | A | * | 7/1986 | Lau .................. E21B 43/18 166/268 |
| 2004/0020656 | A1 | * | 2/2004 | Nicholson ............... E21B 43/00 166/370 |
| 2012/0247760 | A1 | | 10/2012 | Wheeler et al. |
| 2014/0190689 | A1 | | 7/2014 | Warren et al. |
| 2014/0216739 | A1 | * | 8/2014 | Brown ................ E21B 43/2408 166/272.3 |
| 2015/0159476 | A1 | | 6/2015 | Warren et al. |
| 2015/0198027 | A1 | | 7/2015 | Wickramathilaka et al. |
| 2017/0226836 | A1 | * | 8/2017 | Sanders ............. E21B 43/2408 |

OTHER PUBLICATIONS

L. Zhao, et al., "Numerical Study and Economic Evaluation of SAGD Wind-Down Methods," Journal of Canadian Petroleum Technology, 42(1): 53-57 (2003).

Ran Li, et al., "Chemical Additives and Foam to Enhance SAGD Performance," SPE-174489, Canada Heavy Oil Technical Conference, Jun. 9-11, Calgary, Alberta, Canada (2015).

* cited by examiner

BLOWDOWN PRESSURE MAINTENANCE WITH FOAM

CROSS-REFERENCE TO RELATED APPLICATIONS

This application claims the benefit, and priority benefit, of U.S. Provisional Patent Application Ser. No. 62/350,783, filed Jun. 16, 2016, the disclosure and contents of which are incorporated by reference herein in their entirety.

FEDERALLY SPONSORED RESEARCH STATEMENT

Not applicable.

FIELD OF THE INVENTION

The invention relates to petroleum production for heavy oil and/or bitumen. In particular, the invention relates to a process in which foams are used to maintain pressure in the mature chamber during operations at the blowdown stage of a steam-assisted gravity drainage (SAGD) process or other enhanced oil recovery process.

BACKGROUND OF THE INVENTION

Production of heavy oil and bitumen from a subsurface reservoir can be quite challenging. The initial viscosity of the oil at reservoir temperature prior to any treatment, is often greater than a million centipoise (cP). High viscosity oil cannot be pumped out of the ground using typical methods, and is often mined or processed in situ. Surface mining is limited to reservoirs at depths of less than about 70 meters. The majority of bitumen reserves, however, are present at depths that make surface mining uneconomical. These deeper reserves are typically produced using in-situ recovery methods.

In-situ thermal oil recovery processes such as Cyclic Steam Stimulation (CSS) and Steam-Assisted Gravity Drainage (SAGD) are widely used commercial processes for recovering oil from heavy oil/bitumen reservoirs. These thermal processes generally apply heat energy to reservoir using steam or hydrocarbon solvents as the working fluid. As temperature in the reservoir increases, the viscosity of the heavy bitumen (or oil) decreases and the oil is able to flow into a production well.

Steam-assisted gravity drainage (SAGD) is an in situ processing method first introduced by Roger Butler in 1973 as a means of producing heavy oil and bitumen. SAGD involves the use of two parallel and superposed horizontal wells (a well-pair) that are vertically separated by about 5 meters. (See FIG. 1). The SAGD process is roughly described as follows. During the first phase of a SAGD process, sometimes referred to as start-up, steam is circulated between the injector and the producer to establish mobility of fluids between the two wells. Next the production phase of SAGD begins and the steam injection is limited to the injector and oil is produced through the producer. As the steam chamber grows vertically and laterally, viscosity of the bitumen is reduced and the bitumen is drained to the producer below by gravity. Initially, high pressures may be employed, generally around 15 to 20 kPa/meter, to promote vertical development of the steam chamber, which promotes high drainage/production rates. As the steam chamber matures, the pressure of the steam chamber it may be reduced, to help mitigate the rising steam-to-oil ratios caused by heat losses to the overburden/thief zones on top of the reservoir.

As an in situ recovery process, SAGD is very energy intensive largely because the reservoir rock and fluids must be heated enough to lower the viscosity of and mobilize the petroleum. Heat is also lost to over burden and under burden which may contain, water and gas intervals, thus reducing the thermal efficiency of the process. As a result of being energy intensive, SAGD requires a large capital investment in steam generation and water treatment facilities. The operating expense associated with the SAGD process can also be high due to the expense of generating steam and treating produced water. As a result, SAGD is typically operated until the steam-to-oil ratio (and hence the energy intensity) increases to the point where continued operation is either un-economical or otherwise impractical (e.g., incremental recovery from steam injection can no longer be achieved).

Foam has been used in SAGD to block thief zones, decrease channeling, and improved oil displacement during SAGD. Foam is dispersion of gas in a continuous water phase with thin films (lamella), acting as a separator. Given its sensitivity to oil distribution, foam tends to reside in higher permeability layers with less residual oil. Thermally stable surfactants are essential to maintain the foam life because surfactants stabilize lamella by decreasing the water-gas interfacial tension. Li, et al., have reviewed how chemical additives and foam can enhance SAGD performance. Li et al., "Chemical Additives and Foam to Enhance SAGD Performance," *SPE Canada Heavy Oil Technical Conference*, 9-11 June, Calgary, Alberta, Canada (2015).

Eventually, every SAGD chamber (which may be an amalgamation of chambers associated with a number of injectors and producers) reaches the point at which economic steam injection operations become impractical. At this point, the SAGD wells are placed in what industry frequently refers to as "blowdown" in which steam injection into the steam chamber typically ceases or is significantly reduced. During blowdown, reservoir pressure must typically be maintained in order to continue producing oil from other locations in the reservoir.

Non-condensable gas (NCG) has been injected by operators to maintain pressure in SAGD operations during mid-late life development stages of SAGD. Meg Energy at their Christina Lake project has co-injected methane with steam as early as at 30% recovery of the drainage area OOIP. Cenovus Energy has performed multiple methane co-injection projects at their Foster Creek and Christina Lake projects. NCG was injected at UTF Phase B, during the wind-down of those wells. Multiple authors have discussed NCG blowdown. See, e.g., Zhao et al., "Numerical Study and Economic Evaluation of SAGD Wind-Down Methods," *Journal of Canadian Petroleum Technology*, 42(1): 53-57 (2003).

There is a need to improve SAGD methods during blowdown. Improved SAGD blowdown is required to reduce capital expenses during late stage SAGD operations, improve production from nearby less mature SAGD operations, and improve oil recovery economics including reduced SOR, reduced NCG, and improved thermal efficiency.

SUMMARY OF THE INVENTION

The present invention generally relates to a method and system of using/creating a foam/colloidal dispersion/gel (collectively "foam") that occupies the depleted void space within a steam chamber in order to maintain pressure and improve blowdown performance. A significant void volume of pore space within the depleted steam chamber can be occupied with the use of small amounts of surfactant (or other foaming agent(s)), water, and, optionally, small amounts of NCG.

In some embodiments, the present invention may improve the performance of steam chambers that are being operated at different pressures and are in fluid communication with the steam chamber where foam is applied. This improved performance is because the foam is expected to mitigate pressure or fluid communication (e.g., steam or NCG migration). As an example, the present invention addresses production problems introduced by the current technology of replacing steam with non-condensable gas in a mature SAGD steam chamber resulting in significant NCG migration to a less mature chamber or significant steam migration from the less mature chamber to the mature (and less productive) chamber.

In general, in one aspect, the invention features a method for recovering petroleum from a formation containing heavy hydrocarbons. This process may be applied to any enhanced oil recovery (EOR) process that has a blowdown stage where pressure is drawn down as the reservoir matures. Injection based oil recovery methods including thermal recovery, such as Cyclic Steam Stimulation (CSS), Steam Flooding, Steam-Assisted Gravity Drainage (SAGD), Vapor Extraction (VAPEX), Single Well SAGD (SW-SAGD), Cross Well SAGD (X-SAGD), Foam Assisted SAGD (FA-SAGD), and the like; chemical recovery methods such as alkali flooding, surfactant flooding, solvent flooding, miscible flooding including $CO_2$ or non-condensable gas (NCG); In Situ Combustion (ISC), Toe-Heel Air Injection (THAI), Combustion Overhead Gravity Drainage (COGD) and the like; combinations thereof, or other recovery method that may have a blowdown period. In order to prevent lower pressure at the location of blowdown a foam/colloidal dispersion/gel (collectively "foam") is injected to occupy the depleted void space within a reservoir chamber in order to maintain pressure and prevent mobility into, through, or out of the reservoir chamber during blowdown.

In one embodiment, a foam is injected during blowdown of thermal SAGD production comprising an injection well and a production well in fluid communication with the formation. In some recovery processes, the injection well may be the same as the production well and may include additional vertical or horizontal wells in an interconnected well system. The method includes injecting steam into the formation through the injection well to form a steam chamber in the formation. The method further includes recovering a fluid including heavy hydrocarbons from the production well during the injection process. The method further includes engaging in blowdown operations after the steam chamber reaches maturity and a mature chamber is formed. The blowdown operations include injecting a foam into the mature chamber. The injection of the foam in the mature chamber maintains pressure within the reservoir. The method further includes recovering the fluid comprising heavy hydrocarbons during the blowdown operations, wherein the foam injected in the mature chamber improves recovery of the fluid.

In general, in another embodiment, the invention features a method for recovering petroleum from a formation containing heavy hydrocarbons. In this method, an injection well and a production well are in fluid communication with the formation. The method includes injecting a first fluid into the formation through the injection well to form a chamber in the formation. The first fluid is solvent(s), steam, or a combination thereof. The method further includes recovering a second fluid including heavy hydrocarbons from the production well utilizing an enhanced oil recovery process and forming a mature chamber. The method further includes engaging in blowdown operations after the formation of the mature chamber. The blowdown operations include injecting a foam into the mature chamber. The blowdown operations further include maintaining pressure in the mature chamber. The method further includes recovering the second fluid including heavy hydrocarbons during the blowdown operations.

Implementations of the invention can include one or more of the following features:

The injection of the foam into the mature chamber can fill a void space within the mature chamber, can maintain pressure in the mature chamber sufficient to continue hydrocarbon recovery, and can maintain an elevated saturation temperature of water existing within the mature chamber.

The injection of the foam can maintain or increase production rates of the second fluid during the blowdown operations.

The injection of the foam can improve the quality of the recovered petroleum includes a quality characteristic selected from the group consisting of TAN reduction, lower sulfur content, higher API, lower viscosity, improved emulsion characteristics, reduction in heavy metal content, and combinations thereof.

The injection of the foam into the mature chamber can include injecting foam or a foaming agent into the mature chamber through the injection well.

The injection of the foam into the mature chamber can include injecting the foam into the steam chamber through a third well where the third well is neither the injection well nor the production well, but part of an interconnected well system (that is, a set of wells in pressure or fluid communication).

Blowdown operations can encompass numerous mechanisms for reducing pressure as the reservoir matures. Pressure may be reduced for blowdown by reducing the injection rate, injection pressure, and/or injection volume. Blowdown may also include removing pressure from the formation by removing gasses or liquids from the formation. In one embodiment, gases may be removed through a nearby vertical well at the top of the formation. In another embodiment, blowdown is accomplished by replacing some or all of the steam injection with the injection of a foam, in order to maintain steam chamber pressure.

Blowdown can further include injecting a non-condensable gas (such as to achieve a specific reservoir pressure). Alternatively, blowdown operations can further include not injecting a non-condensable gas.

Foam may be injected when blowdown is initiated or after blowdown has begun.

Foam can be generated at a surface location before injecting the foam into the mature chamber. Foam components can be premixed on the surface prior to injection. Foam can also be generated sub-surface.

The step of generating the foam sub-surface can be selected from the group consisting of generating foam including using a downhole static mixer, foam generation through a perforation in the well, natural mixing in the well, in situ foam generation in the formation, temperature dependent foam generation, time-delayed foam generation, chemical/oil saturation dependent generation, foam generated through reactions of chemical compounds and combinations thereof.

The step of injecting the foam into the mature chamber can include injecting a solution including a foaming agent and generating the foam in situ in the mature chamber. The injection of foam can be in conjunction with steam, non-condensable gases, such as, but not limited to, methane or air, and may be injected in conjunction with condensable hydrocarbon solvents to reduce the solvent retention volumes and solvent losses in solvent-steam operations. Foam can be generated or maintained by injecting NCG, surfactant, or combinations to ensure the foam volume and pressure are sufficient.

The step of injecting the foam into the mature chamber can include injecting hot water mixed with a foaming agent selected from the group consisting of surfactants, alkali, colloidal foams, aerosols, hydrosols, emulsions, dispersions, and combinations thereof.

The foam can be formed from a foaming agent selected from the group consisting of alkyl benzene (aromatic) sulfonates, alpha/internal olefin sulfonates, alkyl aryl sulfonates, alkoxy sulfates, alkaline metal carbonates, bicarbonates, hydroxides, sodium carbonate, sodium bicarbonate, sodium hydroxide, potassium carbonate, potassium bicarbonate, potassium hydroxide, magnesium carbonate, calcium carbonate, sodium metaborate, and combinations thereof.

The method can further include selecting an foaming agent from which to form the foam based upon a foam characteristic selected from the group consisting of: (a) thermal and chemical stability at high temperatures at which these thermal recovery processes are operated, (b) low density and low viscosity, (c) the ability to withstand the salinity/divalent cations in the particular formation brine, (d) low adsorption onto rock/clay surfaces in the particular reservoir, (e) the ability to be non-reactive with the particular reservoir rock minerals and cause precipitation, (f) the ability of not negatively impacting surface treating, (g) the ability to be effective at the particular reservoir brine pH, (h) the ability of not negatively impacting the value of bitumen produced (i) low cost, and (j) combinations thereof.

The method can further include selecting a foaming agent from which to form the foam in which the foam has a low density between about 0.0006 g/cm$^3$ and about 0.0770 g/cm$^3$. The method can further include selecting a foaming agent from which to form the foam in which the foam has a low viscosity can be between about 0.01 cP and 0.022 cP.

The blowdown operations can further include utilizing the foam in a heat scavenging process.

The foam injected can be utilized to displace trapped heavy hydrocarbons and drive the heavy hydrocarbons to a condensation front or drainage interface of the steam chamber.

The step of injecting the foam into the steam chamber can provide for a second steam-assisted gravity drainage process to be maintained at higher pressures in a second steam chamber adjacent to the mature chamber, resulting in improved recovery and thermal efficiency of the second chamber.

The foam injected in the mature chamber can improve recovery of the second fluid.

In general, in another aspect, the invention features a system for recovering petroleum from a formation containing heavy hydrocarbons. The system includes an injection well and a production well. The injection well and the production well are in fluid communication with the formation. The system further comprises a mature chamber in the formation. The mature chamber was formed by an enhanced oil recovery process. The mature chamber is in the blowdown phase for the enhanced oil recovery process. The system further includes a stream including a foam injected into the mature chamber. The foam in the mature chamber maintains pressure of the mature chamber and improves recovery of the fluid.

Implementations of the invention can include one or more of the following features:

The enhanced oil recovery process can be selected from the group consisting of steam injection using (a) cyclic steam stimulation (CSS), (b) steam flooding, (c) steam-assisted gravity drainage (SAGD), (d) vapor extraction (VAPEX), (e) single well SAGD (SW-SAGD), (f) cross well SAGD (X-SAGD), (g) foam assisted SAGD (FA-SAGD), (h) chemical recovery methods, (i) alkali flooding, (j) surfactant flooding, (k) solvent flooding, (l) miscible flooding, (m) in situ combustion (ISC), (n) toe-heel air injection (THAI), (o) combustion overhead gravity drainage (COGD), and (p) combinations thereof.

The enhanced oil recovery process is a thermal recovery process.

The foam in the mature chamber can fill void space within the mature chamber, can maintain higher pressure in the mature chamber, can keep saturation temperature of water existing within the mature chamber elevated, and can improve production rates of the fluid during the blowdown operations.

The system can further include a second injection well and a second production well, which second injection well and the second production well are in fluid communication with the formation. The system can further include a second chamber in the formation. The second chamber may have been formed from a second fluid injected into the formation through the second injection well utilizing a second enhanced oil recovery process. The second chamber can be adjacent or neighboring the mature chamber. The foam can provide for the second enhanced oil recovery process to be maintained at higher pressures in the second chamber, resulting in improved recovery and thermal efficiency.

The first enhanced oil recovery process and the second enhanced oil recovery process can be the same type of enhanced oil recovery process. Alternatively, they can be different types of enhanced oil recovery processes.

In general, in another aspect, the invention features a method for recovering petroleum from a formation containing heavy hydrocarbons. In this method, an injection well and a production well are in fluid communication with the formation. The method includes injecting steam into the formation through the injection well to form a steam chamber in the formation. The method further includes recovering a fluid including heavy hydrocarbons from the production well utilizing an enhanced oil recovery process. The method further includes forming a mature chamber from the steam chamber utilizing the enhanced oil recovery process. The method further includes engaging in a blowdown operation after the formation of the mature chamber. The blowdown operation includes injecting a foam into a mature chamber. The injection of the foam in the mature chamber maintains pressure of the mature chamber. The method further includes recovering the fluid including heavy hydrocarbons during the blowdown operation.

Implementations of the invention can include one or more of the following features:

The method can further include selecting a transition condition for transitioning from the method before the step of engaging in the blowdown operation to the step of engaging in the blowdown operation. The method can further include determining when the transition condition has been met. The method can further include that, upon determination that the transition condition has been met, transitioning to the step of engaging in the blowdown operation.

The transition condition can be selected from the group consisting of vapor chamber growth, production performance, a pre-selected pressure below native reservoir pressure of the formation, a pre-selected pressure of an adjacent formation, a pressure below a pre-selected pressure of the formation, an environmental factor, a market condition, production costs, material costs, market price for hydrocarbons, the market price for solvents, and combinations thereof.

NOMENCLATURE

Figure 1:
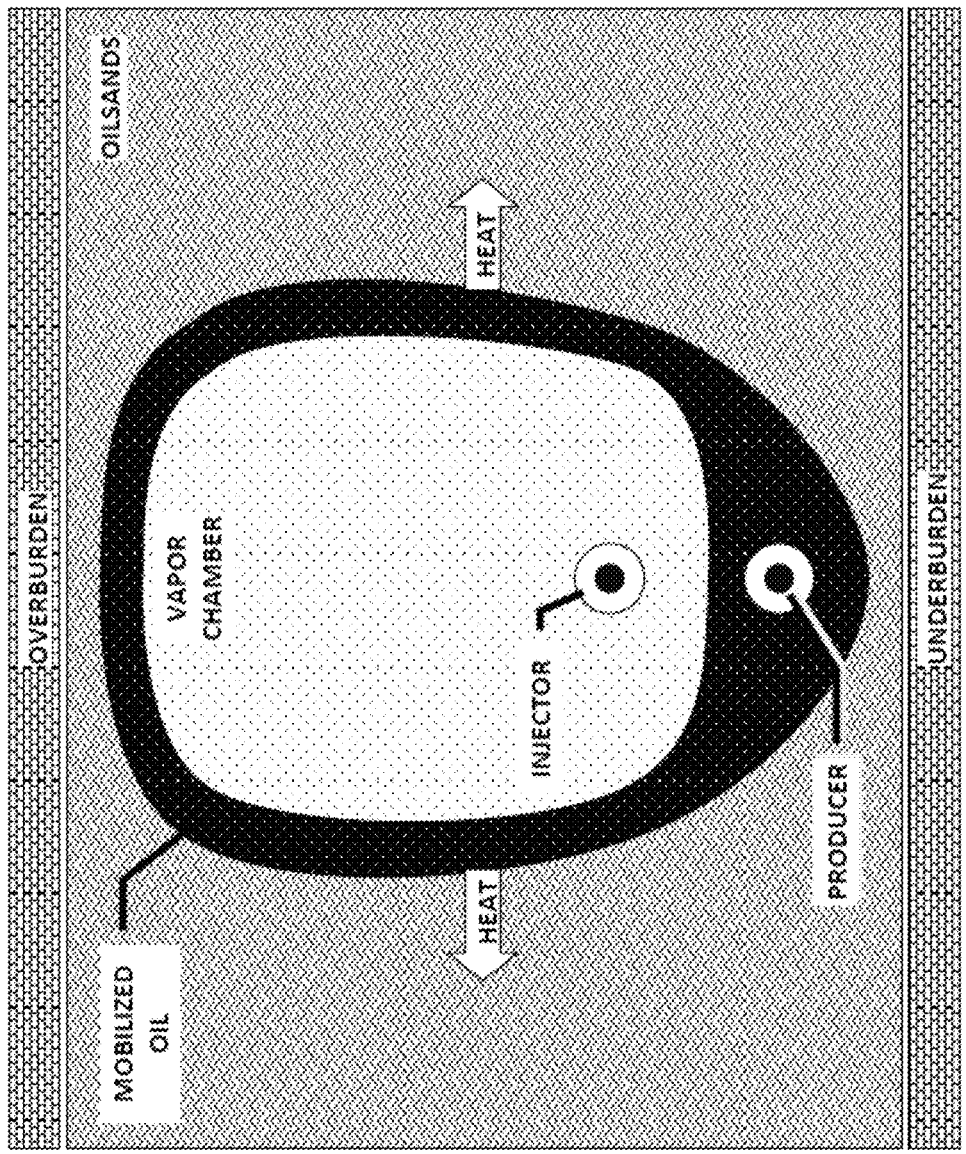
FIG. 1 (Prior Art) depicts a conventional steam-assisted gravity drainage in an oil sand formation.

"Formation" as used herein refers to a geological structure, deposit, reserve or reservoir which includes one or more hydrocarbon-containing layers, one or more non-hydrocarbon layer, an overburden and/or an underburden. The hydrocarbon layers can contain non-hydrocarbon material, as well as hydrocarbon material. (The non-hydrocarbon layer can be a layer that contains only a nominal amount of hydrocarbons, such as mudstone). The overburden and underburden may contain one or more different types of low-permeability materials, for example rock, shale, mudstone wet carbonate, or tight carbonate.

"Petroleum deposit" refers to an assemblage of petroleum in a geological formation. The petroleum deposit can comprise light and heavy crude oils and bitumen. Of particular interest for the method described herein are petroleum deposits which primarily comprise heavy petroleum, such as heavy oil and petroleum.

"Injection well" or "injector" refers to a well into which a fluid is injected into a geological formation. The injected fluid can comprise, for example, a gaseous mixture of steam, NCG and/or hydrocarbon solvent. The injected fluid can also comprise a liquid solvent, such as a liquid hydrocarbon solvent or $CS_2$.

"Production well" or "producer" refers to a well from which a produced fluid is recovered from a geological formation. The produced fluid can comprise, for example, a petroleum product, such as heavy oil or bitumen.

"Horizontal drilling" refers to a process of drilling and completing a well, beginning with a vertical or inclined linear bore, which extends from the surface to a subsurface location in or near a target reservoir (e.g., gas, oil), then bears off at an arc to intersect and/or traverse the reservoir at an entry point. Thereafter, the well continues at a horizontal or nearly horizontal attitude tangent to the arc, substantially or entirely remaining within the reservoir until the desired bottom hole location is reached. (Of course, the "bottom hole" of a horizontal well is the terminus of the horizontal wellbore rather than the gravitational bottom of the vertical wellbore.)

A "horizontal well" is a well produced by horizontal drilling. Horizontal displacements of more than 8000 feet (2.4 km) have been achieved. The initial linear portion of a horizontal well, unless very short, is typically drilled using rotary drilling techniques common to drilling vertical wells. A short-radius well has an arc with a 3-40 foot (1-12 m) radius and a build rate of as much as 3° per 100 feet (30 m) drilled. A medium-radius well has an arc with a 200-1000 foot (61-305 m) radius and build rates of 8-30° per 100 feet drilled. A long-radius well has an arc with a 1000-2500 (305-762 m) foot radius. Most new wells are drilled with longer radii, while recompletions of existing wells tend to employ medium or short radii. Medium-radius wells are the most productive and most widely used.

Horizontal wells confer several benefits. Operators are often able to develop a reservoir with fewer horizontal wells than vertical wells, since each horizontal well can drain a larger rock volume about its bore than a vertical well could. One reason for this benefit is that most oil and gas reservoirs are more extensive in their horizontal (area) dimensions than in their vertical (thickness) dimension. A horizontal well can also produce at rates several times greater than a vertical well, due to a higher wellbore surface area within the producing interval.

In some systems, the injection and production wells are vertically aligned or in near vertical alignment with each other. Of course, additional injection and production wells can be used and the placement can be varied accordingly, for example 3, 4 or 5 injection wells, and 2, 3 or 4 production wells. The placement need not be exact, and can vary according to convenience, surface structures, subsurface impediments, and available equipment and/or technology. Thus, placement of parallel, perpendicular, or vertically aligned wells, etc., is only a rough description. As example of additional injection wells is disclosed and taught in co-owned U.S. Patent Appl. Publ. 2012/0247760, "Dual Injection Points IN SAGD," published Oct. 4, 2012, to Wheeler et al. (incorporated herein by reference in its entirety), which describes a method of receiving petroleum from a formation with at least two injection wells and one production well using steam co-injected with NCG and/or a hydrocarbon solvent.

In some embodiments, the first and second injection wells can be multilateral wells, wherein each is connected to the same vertical well bore, but branches horizontally at different intervals. "Multilateral well" refers to a well, which is one of a plurality of horizontal branches, or "laterals", from a vertical wellbore. Such wells have at least two such branches and allow access to widely spaced reservoir compartments from the same wellbore, thus saving the cost of drilling multiple vertical wellbores and increasing the economy of oil and gas extraction. For example, a well with a fishbone configuration has a single vertical wellbore and a plurality of non-vertical (e.g., horizontal), deviated portion connected to the vertical wellbore and extending into the formation. The non-vertical portions of a fishbone-configured well can further progress through the reservoir at angles different from the original angle of deviation.

"Ex situ processing" refers to petroleum processing which occurs above ground. Oil refining is typically carried out ex situ.

"In situ processing" refers to processing which occurs within the ground in the reserve itself. Processes include heating, pyrolysis, steam cracking, and the like. In situ processing has the potential of extracting more oil from a given land areas than ex situ processes since they can access material at greater depths than surface mines can. An example of in situ processing is SAGD.

Figure 6:
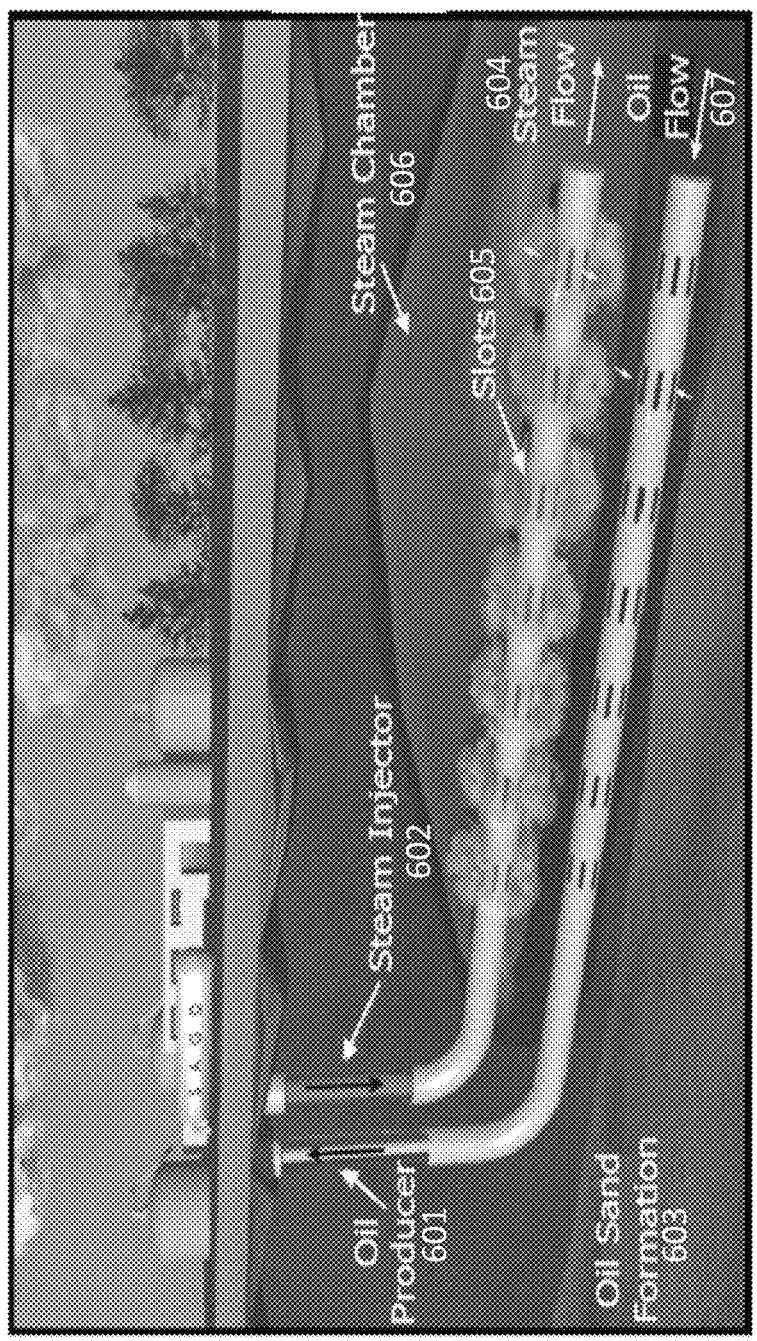
FIG. 6 illustrates a schematic view of the SAGD operation.

"Steam-assisted gravity drainage" or "SAGD" refers to an in situ recovery method which uses steam to assist in situ processing, including related or modified processes such as steam-assisted gravity push (SAGP), and the original SAGD method as described by U.S. Pat. No. 4,344,485, "Method For Continuously Producing Viscous Hydrocarbons By Gravity Drainage While Injecting Heated Fluids," issued Aug. 17, 1982, to Butler. In general, such as shown in FIG. 6, the method requires two horizontal wells (production well 601 and injection well 602) drilled into a reservoir 603 (illustrated in FIG. 6 as an oil sand formation). The wells 601-602 are drilled vertically to different depths within the reservoir 603 then, using direction drilling, the wells are extended horizontally, resulting in horizontal wells 601-602 vertically aligned to and spaced from each other. Typically, the production well 601 is located above the base of the reservoir but as close as possible to its bottom, for example between 1 and 3 meters above the base of the oil reserve. The injection well 602 is placed above (or nearly above) the production well 601, and is supplied steam from the surface (in the direction shown by steam flow 604). The steam exits the injection well 602, such as through slots 605 and rises, forming a steam chamber 606 that slowly grows toward the top of the reservoir 603, thereby increasing reservoir temperature and reducing viscosity of the petroleum deposit. Gravity pulls the petroleum and condensed steam through the reservoir 603 into the production well 601 at the bottom, where the liquid is pumped to the surface (in the direction shown by oil flow 607). At the surface, water and petroleum can be separated from each other.

"Non-condensable gas" or "NCG" refers to a chemical that remains in the gaseous phase under process conditions. For example, NCGs used during in situ processing at a petroleum deposit remain gaseous throughout the process, including under the conditions found in the fossil fuel deposit. Examples of suitable NCGs include, but are not limited to, air, methane ($CH_4$), carbon dioxide ($CO_2$), nitrogen ($N_2$), carbon monoxide (CO), and flue gas. "Flue gas" or "combustion gas" refers to an exhaust gas from a combustion process that exits to the atmosphere via a pipe or channel. Flue gas can typically comprises nitrogen, $CO_2$, water vapor, oxygen, CO, nitrogen oxides ($NO_x$) and sulfur oxides ($SO_x$). The combustion gases can be obtained by direct steam generation (DSG), reducing the steam-oil ratio and improving economic recovery.

"Hydrocarbon solvent" refers to a chemical consisting of carbon and hydrogen atoms which is added to another substance to increase fluidity and/or decrease viscosity. A hydrocarbon solvent, for example, can be added to a fossil fuel deposit, such as a heavy oil deposit or bitumen, to partially or completely dissolve the material, thereby lowering the resultant mixture's viscosity and enabling and enhancing the recovery of the mixture. The hydrocarbon solvent can have, for example, 1 to 12 carbon atoms ($C_1$-$C_{12}$) and includes, for example, butane, propane and hexane. The hydrocarbon solvent can be introduced into a petroleum deposit as a gas or as a liquid. Under the pressures of the petroleum deposit, the hydrocarbon solvent may condense from a gas to a liquid, especially if the hydrocarbon solvent has 2 or more carbon atoms.

"Cumulative steam-oil ratio" or "cSOR" refers to the ratio of cumulative injected steam (expressed as cold water equivalent, CWE) to cumulative petroleum production volume. The thermal efficiency of SAGD is reflected in the cSOR. Typically, a process is considered thermally efficient if its SOR is less than 3, such as 2 or lower. A cSOR of 3.0 to 3.5 is usually the economic limit, but this limit can vary project to project.

"Steam chamber", "vapor chamber" or "steam vapor chamber" refers to the pocket or chamber of gas and vapor formed in a geological formation by steam injection and includes the SAGD or SAGP process. A steam chamber can be in fluid communication with one or more injection wells, for example, two injection wells. During initiation of a SAGD process, overpressurized conditions can be imposed to accelerate steam chamber development, followed by prolonged underpressurization to reduce the steam-to-oil ratio. Maintaining reservoir pressure while heating advantageously minimizes water inflow to the heated zone and to the wellbore. When petroleum is continuously recovered and the cSOR is generally under 4, a steam chamber has likely formed. A cSOR of generally less than 4 implies that heat from the injected steam reaches the petroleum at the edges of the chamber and that the mobilized bitumen is flowing under gravity to the production well.

"Mature Chamber" refers to a well-developed chamber (such as a well-developed steam chamber) in which the petroleum deposit (reservoir) has been significantly depleted or a desired residual oil saturation has been achieved. In one embodiment, residual oil saturation is reduced to the point where economic recovery can no longer be achieved. Once oil recovery is no longer economic, the mature chamber has typically reached the top of the hydrocarbon formation being produced for the reservoir interval, diameter, width and/or length. The mature chamber may be limited by the shape of the hydrocarbon formation, structures within the formation, design of the oil recovery system, land ownership, or a combination of factors.

"Recovery" refers to extraction of petroleum from a petroleum deposit or hydrocarbon-containing layer within a geologic formation.

"EOR" refers to enhanced oil recovery techniques, including those set forth in Table 1 below.

TABLE 1

| EOR Techniques | |
| --- | --- |
| CSS | Cyclic Steam Stimulation or "huff and puff." Steam is injected into a well at a temperature of 300-340° C. for a period of weeks to months. The well is allowed to sit for days to weeks to allow heat to soak into the formation, and, later, the hot oil is pumped out of the well for weeks or months. Once the production rate falls off, the well is put through another cycle of steam injection, soak and production. This process is repeated until the cost of injecting steam becomes higher than the money made from producing oil. Recovery factors are around 20 to 25%, but the cost to inject steam is high. |
| SAGD | Steam Assisted Gravity Drainage uses at least two horizontal wells--one at the bottom of the formation and |

TABLE 1-continued

EOR Techniques

| | |
|---|---|
| | another about 5 meters above it. Steam is injected into the upper well, and the heat reduces the viscosity of the heavy oil. This allows the heavy oil to drain by gravity into the lower well, where it is pumped to the surface. SAGD is cheaper than CSS, allows very high oil production rates, and recovers up to 60% of the oil in place. |
| FA-SAGD | Foam assisted SAGD uses surfactant solution co-injected, continuously or intermittently, with steam into a reservoir to generate steam foam in place with the typical SAGD well-pair configuration. High flow resistance is generally developed in the interwell region that makes steam trap control much easier to achieve. The process may divert steam flow into low permeability zones. |
| VAPEX | Vapor Extraction Process is similar to SAGD, but instead of steam, hydrocarbon solvents are injected into an upper well to dilute heavy oil and enables the diluted heavy oil to flow into a lower well. |
| ISC | In situ combustion involves a burning of a small amount of the oil in situ, the heat thereby mobilizing the heavy oil. |
| THAI | Toe to Heel Air Injection is an ISC method that combines a vertical air injection well with a horizontal production well. The process ignites oil in the reservoir and creates a vertical wall of fire moving from the "toe" of the horizontal well toward the "heel", which burns the heavier oil components and upgrades some of the heavy bitumen into lighter oil right in the formation. Fireflood projects are not extensively used due to the difficulty in controlling the flame front and a propensity to set the producing wells on fire. However, the method uses less freshwater, produces 50% less greenhouse gases, and has a smaller footprint than other production techniques. |
| COGD | Combustion Overhead Gravity Drainage is another ISC method that employs a number of vertical air injection wells above a horizontal production well located at the base of the bitumen pay zone. An initial Steam Cycle similar to CSS is used to prepare the bitumen for ignition and mobility. Following that cycle, air is injected into the vertical wells, igniting the upper bitumen and mobilizing (through heating) the lower bitumen to flow into the production well. It is expected that COGD will result in water savings of 80% compared to SAGD. |
| EM | A variety of electromagnetic methods of heating oil in situ are also being developed. |
| RF | Radio Frequency heating of heavy oil/bitumen/heavy oil reservoirs to decrease the viscosity of the oil allowing it to flow. |
| Resistive Heating | Generating heat by resistance methods to heat the heavy oil/bitumen allowing it to flow and be produced. |
| Gas Injection | A variety of gas injection methods are also used or being developed, including the use of cryogenic gases. |
| CHOPS | Cold Heavy Oil Production with Sand |
| Combo | Any of the above methods can be used in combination. |

"Foam" refers to a foam, colloidal dispersion, or gel. "Foaming agent" means an additive to water used to generate foam either above the surface before injection or sub-surface using a mechanical or natural mixing method. The additive can include, but is not limited to, colloidal foams, aerosols, hydrosols, emulsions, or dispersions.

"Blow down" or "Blow down Operations" refers to the final stage of production where injection in the enhanced recovery processes ceases, is reduced, or is replaced by another injectant such as a non-condensable gas. "Blowdown" is initiated when the economics of the process no longer support the instantaneous steam oil ratio, or the desired recovery factor has been achieved.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," "include," and "contain" (and their variants) are open-ended linking verbs and allow the addition of other elements when used in a claim.

The present invention is exemplified with respect to in situ processing of a heavy oil/and bitumen reservoir using at least one injection well and one production well. However, the systems and methods are exemplary only, and the invention can be broadly applied to any fossil fuel deposit and different numbers and combinations of injection and production wells can be used. The following examples are intended to be illustrative only, and not unduly limit the scope of the appended claims.

DESCRIPTION OF EMBODIMENTS OF THE INVENTION

The present invention is directed to a system and method where foams are used (instead of, or in addition to, NCG) to maintain pressure in a mature chamber during blowdown operations of a SAGD process. Foaming agents such as metal carbonates, bicarbonates and hydroxides, surfactants or any other colloidal foams, aerosols, hydrosols, emulsions or dispersions can be utilized. This process can be used in conjunction with other known art, such as heat scavenging in the steam chamber, or enhanced oil recovery utilizing foams, to displace oil in the steam chamber.

While NCG can be used to maintain or enhance pressure in a SAGD chamber, the inventors of the present invention have recognized that it has several drawbacks. Two key drawbacks are as follows:

(A) First, field operations where NCGs are injected into SAGD steam chambers have demonstrated that a significant amount of the injected NCG is produced back with the bitumen. In addition, NCG may also migrate into adjacent steam chambers where high concentrations of NCG may occur at the drainage interface. This NCG may act as an insulator, reducing interface temperature, thus negatively impacting bitumen drainage rates in adjacent wells. Thus, the use of NCG requires not only a capital investment to inject the NCG, but also additional capital is required to hand and treat the increased produced gas volumes.

(B) Second, NCG-based pressure maintenance may cause interference with nearby steam chambers including less mature steam chambers adjacent to the well-pairs/pads being blowdown. This interference may take the form of material and energy flow in or out of the nearby steam chamber resulting in negative effect on either production rates of bitumen or the steam-to-oil ratio of less mature chamber in the formation.

While steam-foams have been used for diversion processes (where the foam blocks or diverts the steam into other parts of the reservoir for example during steam flood operations), the inventors of the present invention have recognized that the use of foams in a mature chamber during a blowdown process may further enhance recovery within the depleted steam chamber and to allow higher pressure operations to be maintained in adjacent less mature steam chambers enhancing one or more of: thermal performance, improving SOR, reducing NCGs use during blowdown while improving ultimate recovery.

The foam can be generated on the surface or sub-surface and can be injected into the reservoir by utilizing existing horizontal injectors, delineation wells, and/or new vertical or horizontal wells. In one embodiment, surfactant/foaming agent solutions could also be injected together with a non-condensable gas or could be injected intermittently downhole to generate foam in situ.

Water-gas foams have been used historically in conventional oil and gas production. Aerated drilling fluids have been used for workover and remedial well operations. In addition, foams have been utilized to modify intervals of gas injection in stratified formations. They have also been used to prevent leakage through cap-rock in gas storage reservoirs. Some operators have attempted to use foams as a secondary recovery method, though applications in this realm are limited. Foams have also been used in production wells to mitigate water and/or gas inflow. These applications take advantage of the properties of foam and its behavior in a porous media.

Figure 2:
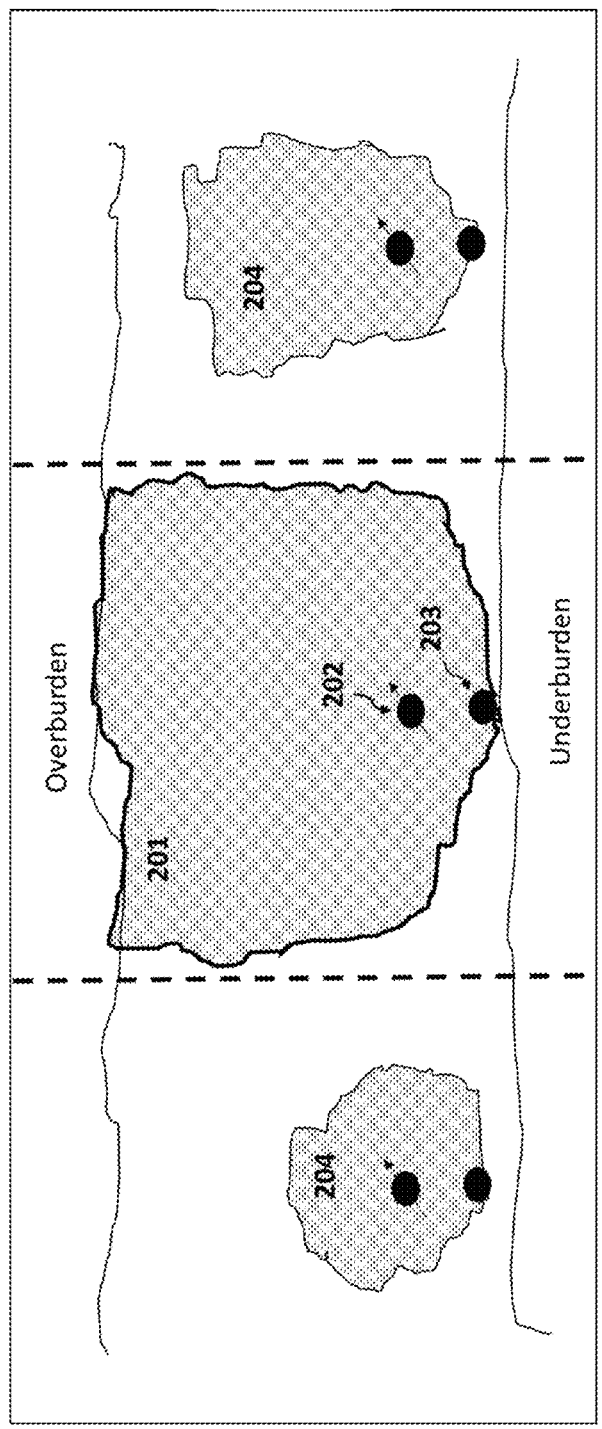
FIG. 2 illustrates a mature SAGD steam chamber at blowdown with two adjacent immature SAGD steam chambers.

FIG. 2 contains an illustration of a mature chamber 201 at blowdown nearby two adjacent immature SAGD steam chambers 204. Each of these steam chambers has both an injection well 202 and a production well 203.

Figure 3:
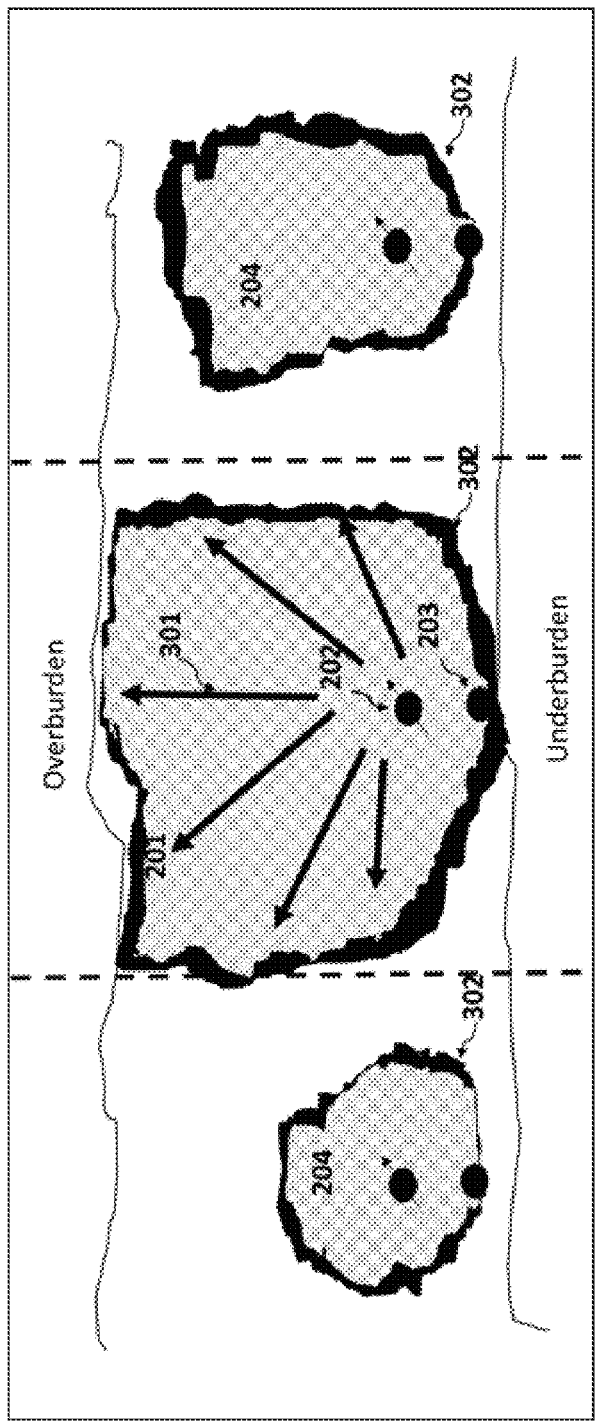
FIG. 3 illustrates the SAGD steam chamber at blowdown of FIG. 2 with NCG.

Traditionally, blowdown operations can include replacing some or all of the steam injection with the injection of a non-condensable gas (NCG) in order to maintain steam chamber pressure. At blowdown an incremental amount (such as 5% to 10%) of the remaining original oil in place (OOIP) in the mature chamber can be recovered. Many operators have suggested the use of non-condensable (i.e., air, methane, $CO_2$, etc.) gas during the blowdown phase, to maintain steam chamber pressure and temperatures, while enhancing bitumen recovery and production rates. FIG. 3 illustrates a mature SAGD steam chamber 201 at blowdown with traditional NCG injection 301 from the injection well 202 in steam chamber 201. Oil at the condensation front/drainage interface 302 is shown in a mature chamber 201 and immature steam chambers 204.

Figure 4:
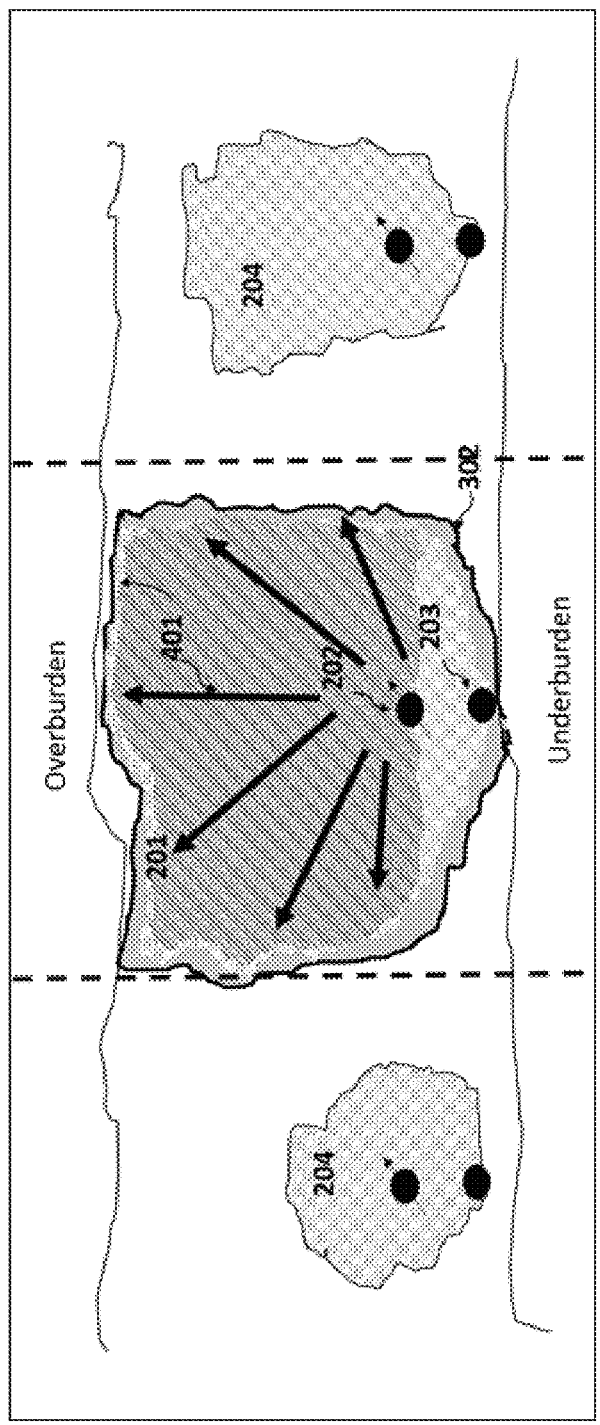
FIG. 4 illustrates the SAGD steam chamber at blowdown of FIG. 2 with foam.

The present invention is a system and method for maintaining reservoir pressure in a mature reservoir chamber by utilizing a foam within the steam chamber, such as shown in FIG. 4. This can be accomplished by injecting steam or hot water and one or more of the following: foaming agents, surfactants, alkali, any other colloidal foams, aerosols, hydrosols, emulsions or dispersions with or without a non-condensable gas, into the reservoir. Reference number 401 show the propagation of the foam within the mature chamber 201. The foam can either be created in situ or the foam could be created at surface, or within the wellbore at the formation depth and injected into the steam chamber. The horizontal portion of the SAGD injector 202 can be used to inject the foam into the mature chamber 201 as well as, new wells or existing vertical completions that penetrate the mature chamber.

The mechanisms involved in embodiments of the present invention can be the formation of foam by means of a surfactant, water, and non-condensable gas; which will form the foam that migrates and fills the mature chamber 201. The foam will migrate to the condensation face 302 of the mature chamber 201, thus occupying significant pore volume within the mature chamber 201. The foam continuously collapses and is regenerated, with the mobile gases within the mature chamber 201, and is continuously replaced as surfactant is produced back with the production fluids at the drainage interface 302.

Figure 5:
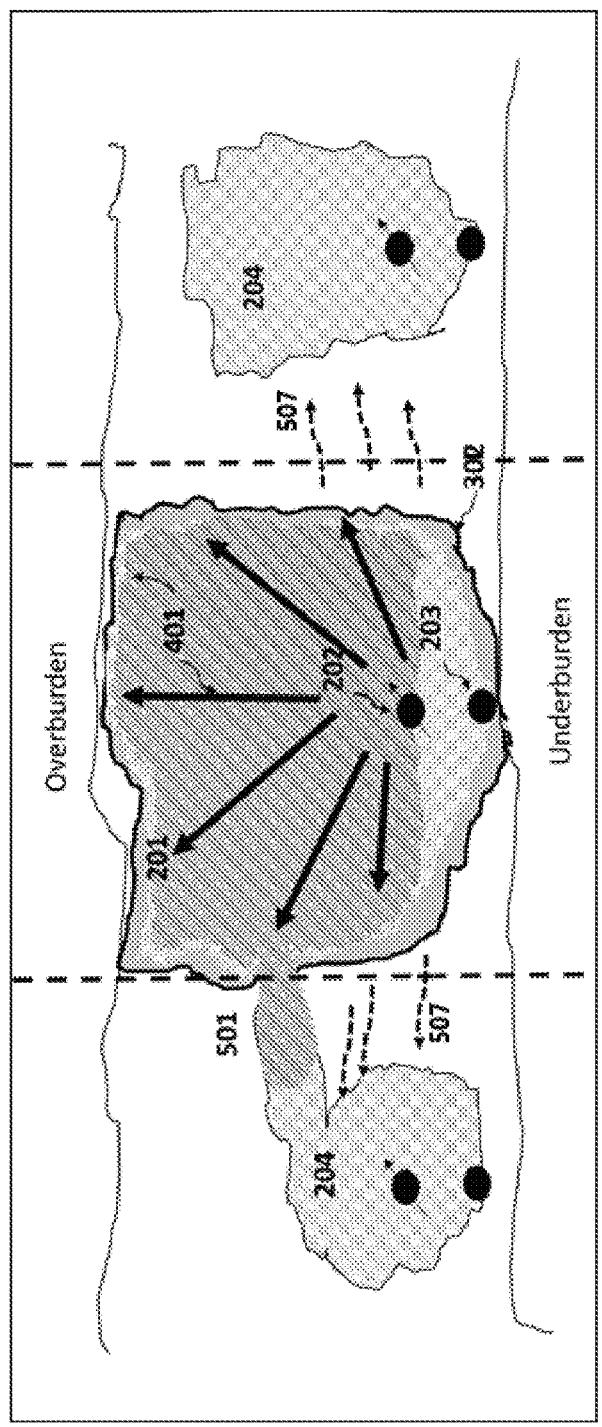
FIG. 5 illustrates the SAGD steam chamber at blowdown of FIG. 2 with foam and with communication between an adjacent immature SAGD steam chamber.

Due to heterogeneities in the reservoir, a mature chamber and immature steam chambers may communicate (such as at interactions 501 and 507 as shown in FIG. 5). The NCG may have communication paths for flow (as shown in interactions 507) from mature chamber 201 into the immature steam chambers 204. Alternatively, or additionally, steam injected into the immature chamber may flow through interaction 501 into the mature chamber 201. The use of foam in the mature steam chamber will mitigate these interactions 501 and 507 improving recovery and thermal efficiency of the more immature steam chamber.

The foam can be utilized for pressure maintenance only, or used in combination with other technologies such as heat scavenging (such as described in U.S. Patent Appl. Publ. No. 2014/0216739, "Heat Scavenging Method for Thermal Recovery Process," published Aug. 7, 2014, to Brown et al.). Other embodiments of the present invention may utilize the foam as a secondary/tertiary recovery method within the steam chamber to displace trapped bitumen/heavy oil, driving it to the condensation front/drainage interface.

Gases that can be co-injected with water and the (chemical) agent(s) (i.e., surfactants) include, but are not limited to nitrogen, methane, carbon dioxide, propane, butane, natural gas, and flue gas. Gases may come in the form of a gas/liquid mixture, including but not limited to natural gas liquids containing propane, butane, pentane, and hexane.

The chosen (chemical) agent(s) to create foam can have some or all of the following characteristics: (a) thermal and chemical stability at high temperatures at which these thermal recovery processes are operated, (b) low density (such as foams having densities between about 0.0006 $g/cm^3$ and about 0.0770 $g/cm^3$ (c) the ability to withstand the salinity/divalent cations in the particular formation brine, (d) low adsorption onto rock/clay surfaces in the particular reservoir, (f) the ability of not negatively impacting surface treating, (g) the ability to be effective at the particular reservoir brine pH, (h) low cost and, (i) neutral or positive impact on the value of the produced bitumen (for example, lower TAN, lower sulfur content, etc.).

In some embodiments, a foam/colloidal dispersion/gel is used that can be temperature and/or oil saturation dependent and can form in situ at the desired temperature and/or oil saturation.

Thermally and chemically stable, non-ionic, anionic, cationic and amphoteric/zwitterionic surfactants that can be used in the present invention include, but are not limited to, alkyl benzene (aromatic) sulfonates, alpha/internal olefin sulfonates, alkyl aryl sulfonates and alkoxy sulfates. Alkaline metal carbonates, bicarbonates and hydroxides can include, but are not limited to sodium carbonate, sodium bicarbonate, sodium hydroxide, potassium carbonate, potassium bicarbonate, potassium hydroxide, magnesium carbonate, calcium carbonate and sodium metaborate can also be used as the foaming agent. The surfactant and/or alkali concentration can be varied and determined for the particular rock/oil/brine system. Other colloidal foams, aerosols, hydrosols, emulsions or dispersions that create a suitable foam can also be utilized in embodiments of the present invention.

As noted before, the foam can be generated at the surface or sub-surface. Sub-surface methods for generating foam include but are not limited to using a downhole static mixer, foam generation through a perforation in the well, natural mixing in the well, in situ foam generation in the reservoir, temperature dependent foam generation, time-delayed foam generation, and chemical/oil saturation dependent generation.

Foam and/or foaming agents can be injected continuously with steam or can be injected in slugs with or without a gas. Accordingly, injection of foam can be implemented as a primary or secondary operating strategy. Furthermore, the method of the present invention can be employed in many thermal recovery processes, including but not limited to, steam-drive, CSS, SAGD and SAGD lateral-drive processes, and expanding solvent-SAGD (ES-SAGD)/solvent assisted process (SAP).

In the SAGD process, bitumen (or oil) is produced until the instantaneous steam-to-oil ratio reaches a point in which economic operations can no longer be achieved using steam or solvent injection. As steam and solvent injection decreases, the SAGD well-pair transitions to "blowdown." At blowdown, the steam chamber is mature and the addition of foam and/or foaming agents begins. Thus, such changes in chamber growth, oil production rate and CSOR may be used as a threshold for transitioning from a steam-injection operation to a blowdown operation. Embodiments can include (a) early blowdown with NCG and foam (e.g., no steam after 40% recovery factor is reached and (b) combined with staged NCG injection (e.g., 30% NCG by volume after 1 year, 60% NCG by volume after 70% recovery factor, etc.) in combination with foam.

The Applicants have found that steam chamber maturity is met when any one or some combination of factors are met including: i) the steam chamber has ceased substantial growth or expansion (e.g./ when the chamber reaches the overburden), ii) when the oil production rate by the steam-injection process has substantially declined, iii) when the cumulative steam-to-oil ratio (CSOR) has substantially increased or iv) where the recovery factor has reached a specified threshold v) project development or regulatory requirements necessitate initiation of blowdown. This can include, but is not limited to, adjacent resource development or mechanical/geomechanical failures requiring blowdown initiation, or vi) where the field-wide optimum for steam distribution indicates requires steam injection to decrease.

Transition conditions may be selected based on a number of considerations and factors as discussed herein. Transition conditions may be selected such as to, for example, achieve a desirable balance between various factors and considerations including engineering trade-offs and economic considerations, such as vapor chamber growth, production performance, costs, and environmental factors. The transition condition may be selected to ensure that the performance or production threshold discussed earlier has been reached. The transition condition may be selected based on operation experience in similar projects at other well pads, or projections according to modeling or simulation calculations, or combination thereof. The transition condition may also be adjusted or selected based on the market conditions including production costs, material costs, and the market values of produced or recovered materials including market oil prices and solvent prices. For example, the transition conditions can include one or more of the following: vapor chamber growth, production performance, a pre-selected pressure below native reservoir pressure of the formation, a pre-selected pressure of an adjacent formation, a pressure below a pre-selected pressure of the formation, an environmental factor, a market condition, production costs, material costs, market price for hydrocarbons, and the market price for solvents.

The present invention is thus able to maintain pressure within a mature chamber by filling the mature chamber volume with foam, once steam and solvent injection is reduced, ceased or replaced with foam, or foam and a non-condensable gas blowdown operations begin. By filling the depleted chamber void space with foam, higher pressures can be maintained in the mature chamber, keeping the saturation temperature of water existing within the mature chamber elevated, and improving bitumen recovery and production rates during the blowdown process. By maintaining pressure within the depleted steam chamber, offset it is predicted that, nearby less mature steam chambers may be operated at higher pressures, mitigating leak-off into the lower pressure depleted mature chambers, improving their production performance, production rates, thermal efficiency (steam oil ratio) and ultimate bitumen recovery.

The present invention further overcomes issues with operating adjacent steam chambers at different pressures and different stages of their recovery life. The present invention allows each chamber to be operated such that recovery is enhanced/maximized and thermal efficiency (i.e., SOR) is optimized. The present invention also mitigates costly gas handling transportation costs, and costly facilities required to treat the incremental gas volumes caused by NCG blowdown.

In one embodiment, chemicals suitable to act as foaming agents in the present invention are Alpha Olefin Sulfonates (AOS), Alkylbenzene Sodium Sulfonates (ABS) or Alkyl Toluene Sulfonate (ATS) co-injected with methane to generate in-situ foam. The potential benefits related to the addition of these chemicals in the blowdown stage of operation may include: helping to eliminate facility constraints, improve project economics, reduce NCG injection and production during blowdown and maintain reservoir pressure with less NCG injected. In a further embodiment, the chemicals suitable to act as foaming agents are $C_{10}$ to $C_{30}$. Alpha Olefin Sulfonates, toluene and benzene based chemicals.

The Applicants recognized that the results of the foamibility and absorption tests demonstrated that for each compound tested that would generate foam and demonstrate thermal stability at reservoir conditions, the Applicant could select different correlations of properties for the chemicals tested. Therefore, the in-situ generated foam could have customized properties based on the surfactant injected. For example, an agent could have lower foamibility but also lower absorption to the rock relatively to other chemicals. These properties enable such a foam to be generated closer to the injection well with a lesser degree of spreading at the higher vertical sections of the previously developed steam chamber by SAGD. Furthermore, a chemical with high foamibility properties could be utilized in spreading to higher sections of the porous media and therefore having slower decay rate, thus helping the economics of the project by reduced chemicals requirement.

EXAMPLES

Example 1—Chemical Screening

Tests were run to examine the solubility, thermal stability, and static adsorption of 12 different compounds. Generally, the chemicals tested fell broadly into the categories of Alpha Olefin Sulfonate (AOS), Alkylbenzene Sodium Sulfonates (ABS) or Alkyl Toluene Sulfonate (ATS), toluene and benzene based chemicals.

Solubility Analysis:

Chemical solutions were made for each compound using two brines: reservoir brine and DI water. Once the solutions were prepared, they were evaluated for their chemical solubility condition. The chemical solution was 0.5 wt % (5000 ppm) in all the experiments.

Once the surfactant solutions were prepared their concentration was checked by HPLC immediately after preparation and 24 hours later to evaluate the concentration of dissolved chemicals as a function of salinity of the brine. The solutions were also inspected visually. Chemical solutions that are fully soluble at room temperature are expected to be more soluble at steam conditions. If the solution is not clear at room temperature, it was tested at higher temperatures (between 80° C. to 130° C.) to determine if the solubility of the chemical improved.

Thermal Stability:

Thermal stability tests were conducted to determine the degree of breakdown of the chemical structure on exposure to steam. In order to evaluate this, the chemical solutions were evaluated for active material content at time zero as well as at 7 days and at 21 days, to track the activity of the molecules. Thermal stability tests were performed using the 0.5 wt % chemical samples prepared in injection brines. The chemical solutions were placed in a high pressure/high temperature cell at atmospheric conditions. One sample of the solution was kept for direct evaluation, as "time-zero" sample. After the elapsed testing period, the sample was removed from the high temperature/high pressure conditions, cooled down and collected for evaluation.

Static Adsorption:

Static absorption tests were conducted using a reservoir rock sample. The tests conducted were comparative and only provide relative adsorption values in comparison to the other chemicals tests. Disaggregated reservoir rock and chemical solutions were brought in contact for 72 hours under steam conditions. High pressure and high temperature flasks were used such that the surfactant solution had enough contact with the sand grains to complete adsorption. The surfactant adsorption was determined by the material balance of surfactant concentration remaining in the supernatant.

A summary of the results is shown in Table 2 indicating which of the chemicals tests demonstrated solubility under steam conditions, thermal stability at high temperature and high pressure, and a high degree of adsorption.

TABLE 2

| No. | Solubility | Thermal Stability | Static Adsorption |
|-----|------------|-------------------|-------------------|
| *A1 | X | X | X |
| *A2 | X | X | X |
| D2 | | | |
| D1 | | | |
| E1 | | X | X |
| E2 | X | X | X |
| F2 | X | X | X |
| *F1 | X | X | X |
| *B1 | X | X | X |
| B2 | | X | X |
| C2 | | | |
| C1 | X | X | |

Example 3—Mobility Reduction Tests

The mobility reduction factor or MRF is an indication of foam strength, half-life, and ability to slow down the movement of injected gas in the reservoir.

A core flood test was conducted to measure the mobility reduction factor (MRF) in porous media. The test was designed to mimic reservoir conditions and evaluate the methane rate reduction based on the foam generated. The MRF value is then integrated into a reservoir simulation to evaluate the impact on the overall blow down process.

Figure 7:
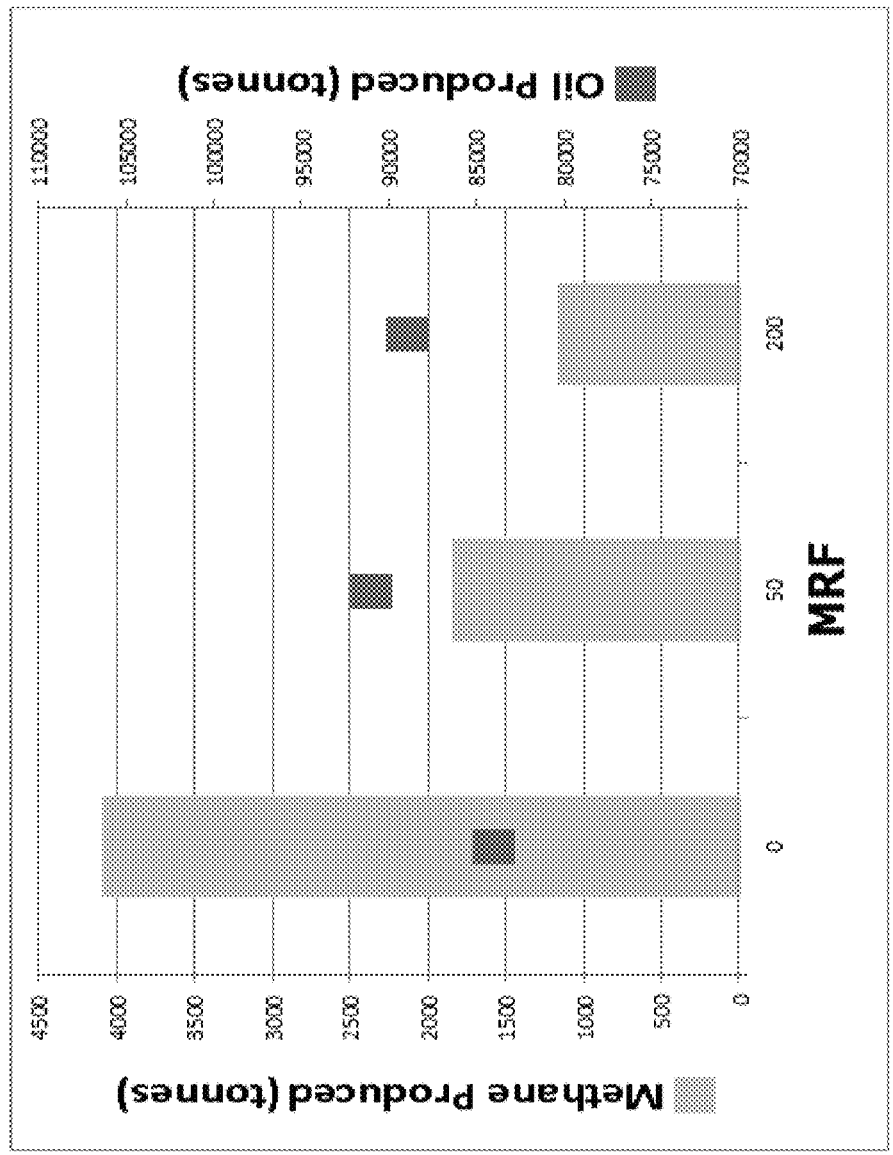
FIG. 7 illustrates a simulation detailing the relationship between methane production and MRF.

As part of the test, various steam quality inputs were examined in order to generate the foam. Having a low steam quality requirement in the foam generation process during the blowdown phase could further enhance the environmental benefit of this technology. Initial simulations showed (FIG. 7) that a chemical demonstrating an MRF value of a 50 could potentially reduce methane production by 50% while maintaining similar oil production rates of a to typical blowdown process. The foam model used applied representative values for the concentration of the foaming component, concentration of the foaming component to achieve maximum foam, maximum oil saturation at which the foam is assumed stable, capillary number, scaling and reduction factors. The reservoir simulation model for SAGD included water, oil and methane properties as well as solid components such as shale, cement carbon steel for piping and sand to account for thermal conductivity and flow. The reservoir modeled was a 3D simulation with representative permeability, porosity and initial saturations to Foster Creek McMurray Formation. Oil saturation in clean sands determined from core and open hole log data typically ranges from 80-90%. The injection control mechanism included sources along the injection casing to simplify the model and the production assumed 10 t/d of gas phase rate passing via the ESP pump. The injection during SAGD and blow down stages was controlled on 3.2 mPa pressure constraint. In the model the blow down stage was invoked after 850 days and a foam model was integrated. The decline in methane production was observed as the MRF value increased suggesting a high correlative behavior between the methane rate and MRF value. The presence of foam showed reduction in the mobility of the gas in the presence of aqueous and oleic phases though not effecting the production of oil via the producing well.

Example 4—Foam Height

Foam height tests were conducted to analyze the height of foam generated and the decay rate of the foam.

The foam height tests were performed in a laboratory for the 12 chemical solutions described in Example 1 at 200° C. and at a pressure of 3000 kPa. Foam was generated in a visual cell with a known chemical concentration. The height of the foam and how quickly it fell was measured. Foam height was increased to the point which the rate of foam generation was near equal to the rate of foam collapse. At this point the flow of $CH_4$ was stopped and foam decay rate measured. This test was conducted with and without the presence of reservoir oil. Foam height and how quickly it falls is an indication of the quality of foam generated in the reservoir. The test conducted was relative in order to compare the various chemical foams to each other. Ideally, a surfactant solution should rapidly produce a tall foam and have a slow rate of foam collapse after $CH_4$ injection is stopped.

Figure 8:
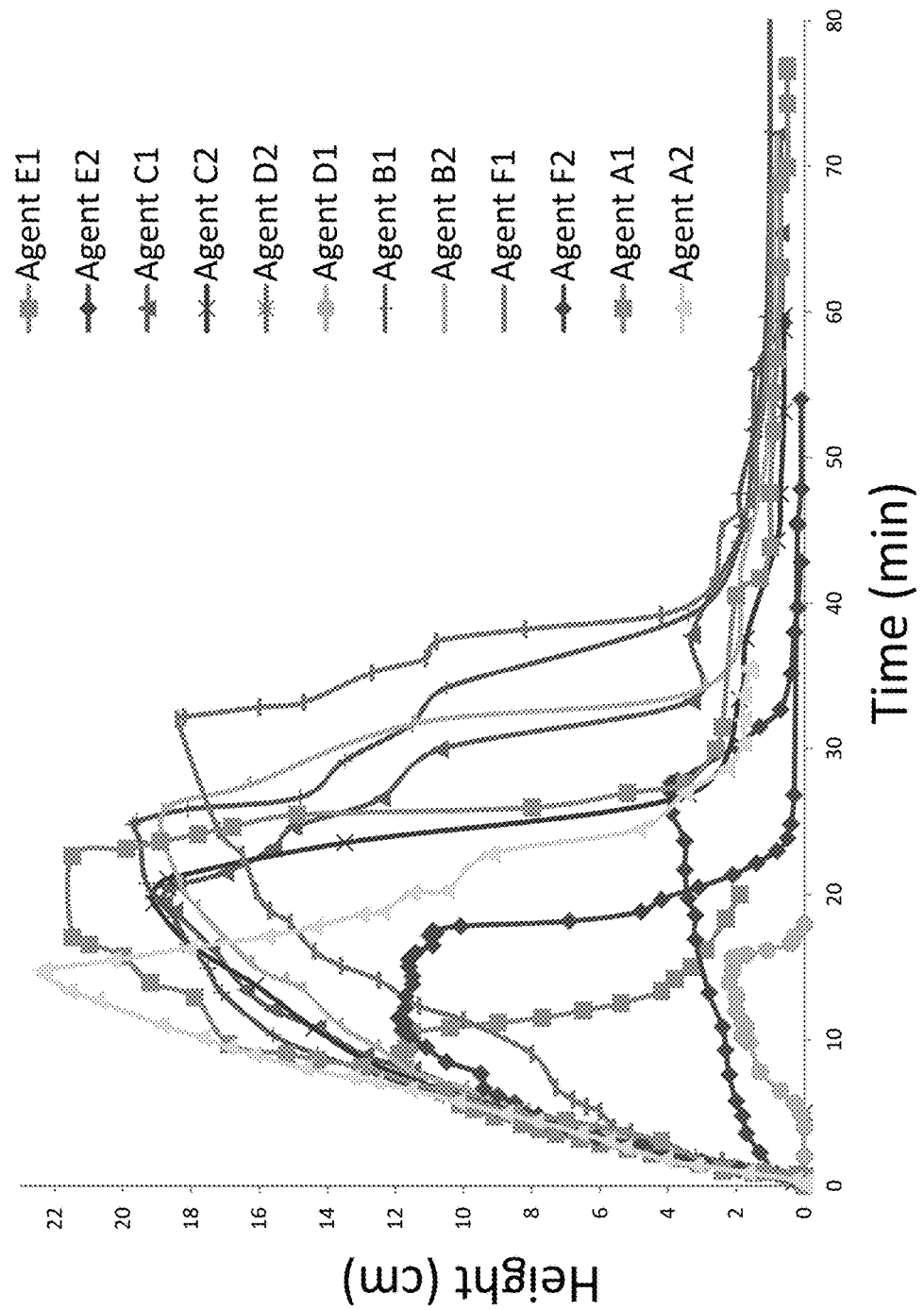
FIG. 8 illustrates a graph showing the foam heights of the compounds tested.

The results are shown in FIG. 8. Chemical solution agents A,B,C yielded the most competitive results for the steam condition tested in terms of for production of foam in the bulk medium. Agents C1 and C2 produced same height of foam in about 20 minutes. Agents B1 and B2 produced same foam height at a slower rate (about 27 minutes), with Agent C1 collapsing a bit slower after $CH_4$ injection was stopped. From Agents A1 and A2 products, the rate of foam generation is almost the same for both, but the rate of foam collapse is slower for agent A1.

Example 5—Blowdown

Figure 9:
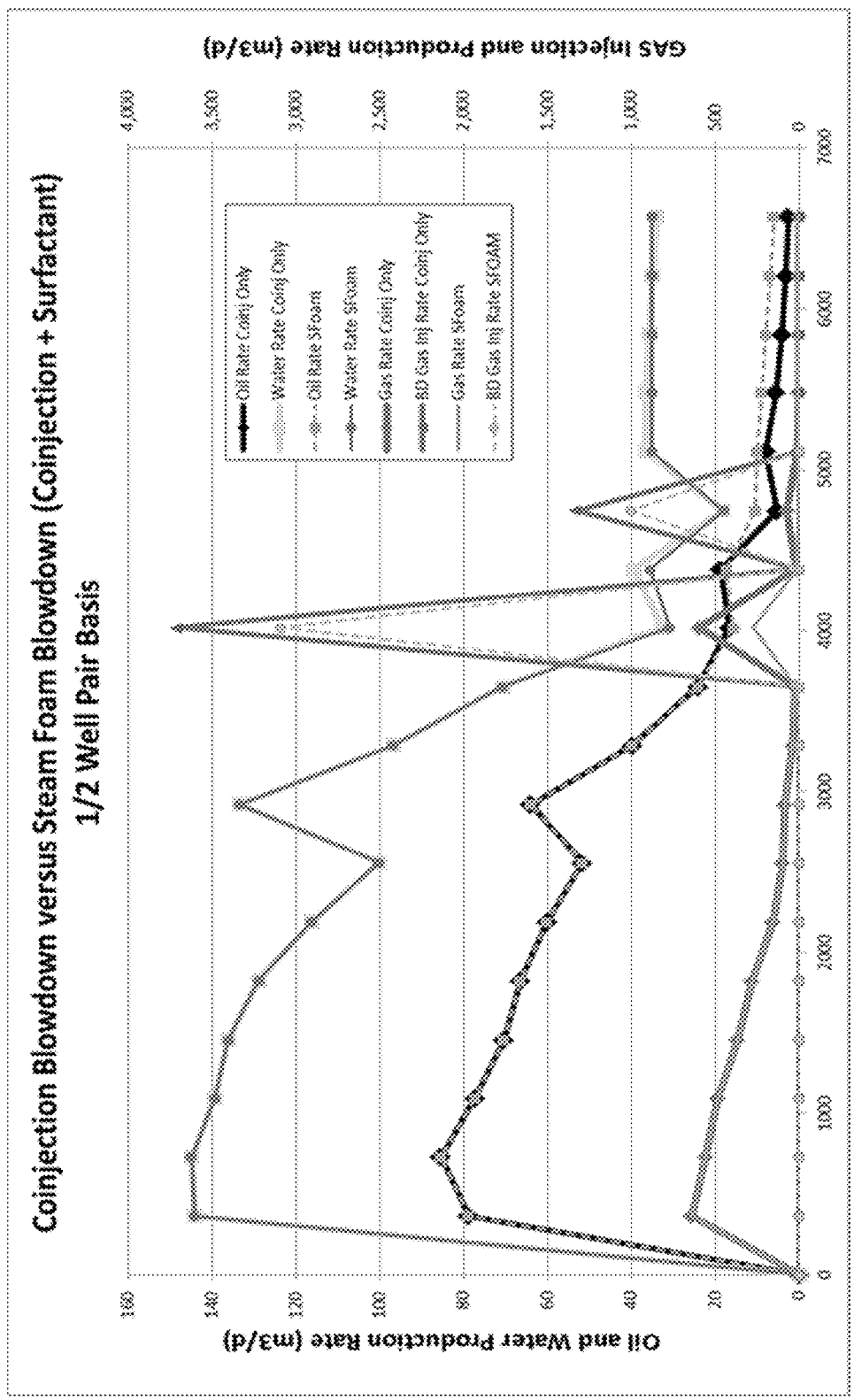
FIG. 9 illustrates a simulation detailing various blowdown production rates.

A ½ well pair element of symmetry model was constructed to predict the effects of the addition of foam during blowdown on reservoir performance and gas production. A 23 m thick reservoir model was created that uses standard oilsands reservoir parameters. A 800 m long SAGD well pair was used for the cases. Under SAGD mode, the well pair was operated for 10 years and then methane gas was introduced with steam to blowdown under a co-injection scheme to the final shut in of the well at 18 years. It is visible from the plot shown in FIG. 9 that the first slug of methane (3,500 m$^3$/d) caused approximately 500 m3/d of gas to be produced. The second slug of co-injected methane, at 1,300 m$^3$/d caused about 300 m3/d of the injected gas to be produced back. The high volume of injected gas being produced back causes a significant efficiency reduction at the bottomhole pump at the production well.

The effect of the adding surfactant to the co-injection scheme with methane and steam to create a foam in the reservoir was then modelled. Surfactant at 2,000 ppm (w surfactant/w steam) was added after 10 years when methane co-injection commenced. It was estimated that this volume of surfactant would produce a foam mobility reduction factor of 25. Based on these inputs, 15% less methane is required to be injected and 50% less methane is produced back at the production well, a substantial reduction. It is evident that the foam is significantly reducing the relative permeability to gas in the reservoir simulation.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above, but is only limited by the claims which follow, that scope including all equivalents of the subject matter of the claims.

REFERENCES

U.S. Pat. No. 4,344,485, "Method For Continuously Producing Viscous Hydrocarbons By Gravity Drainage While Injecting Heated Fluids," issued Aug. 17, 1982, to Butler.
U.S. Patent Appl. Publ. 2012/0247760, "Dual Injection Points IN SAGD," published Oct. 4, 2012, to Wheeler et al.
U.S. Patent Appl. Publ. No. 2014/0190689, "Use of Foam with In Situ Combustion Process," published Jul. 10, 2014, to Warren et al.
U.S. Patent Appl. Publ. No. 2014/0216739, "Heat Scavenging Method for Thermal Recovery Process," published Aug. 7, 2014, to Brown et al.
U.S. Patent Appl. Publ. No. 2015/0159476, "Oil Recovery with Insulating Composition," published Jun. 11, 2015, to Warren et al.
U.S. Patent Appl. Publ. No. 2015/0198027, "Anti-Retention Agent in Steam-Solvent Oil Recovery," published Jul. 16, 2015, to Wickramathilaka et al.
Butler et al., "The Gravity Drainage of Steam-heated Heavy Oil to Parallel Horizontal Wells," Petroleum Society of Canada. doi:10.2118/81-02-07 (1981).
Zhao et al., "Numerical Study and Economic Evaluation of SAGD Wind-Down Methods," *Journal of Canadian Petroleum Technology*, 42(1): 53-57 (2003).
Li et al., "Chemical Additives and Foam to Enhance SAGD Performance," *SPE Canada Heavy Oil Technical Conference*, 9-11 June, Calgary, Alberta, Canada (2015).

The disclosures of all patents, patent applications, and publications cited herein are hereby incorporated herein by reference in their entirety, to the extent that they provide exemplary, procedural, or other details supplementary to those set forth herein.

What is claimed is:

1. A method for recovering petroleum from a formation containing heavy hydrocarbons, wherein an injection well and a production well are in fluid communication with the formation, and wherein the method comprises:
   a) injecting a first fluid into the formation through the injection well in an enhanced oil recovery process to form a chamber in the formation, wherein the first fluid comprises one or more of solvents, steam, and combinations thereof;
   b) recovering a second fluid comprising heavy hydrocarbons from the production well with said enhanced oil recovery process and forming a mature chamber, wherein economic recovery can no longer be achieved with said enhanced oil recovery process;
   c) engaging in blowdown operations after the formation of the mature chamber, wherein the blowdown operations comprise (i) ceasing said injecting the first fluid into the injection well and said enhanced oil recovery process; and (ii) providing a foam in the mature chamber to maintain pressure in the mature chamber with said foam instead of the first fluid; and
   d) recovering the second fluid comprising heavy hydrocarbons during the blowdown operations.

2. The method of claim 1, wherein the providing of the foam into the mature chamber fills a void space within the mature chamber, maintains a pressure in the mature chamber sufficient to continue hydrocarbon recovery, and maintains an elevated saturation temperature of water existing within the mature chamber.

3. The method of claim 1, wherein the providing of the foam maintains or increases production rates of the second fluid during the blowdown operations.

4. The method of claim 1, wherein the providing of the foam improves the quality of the recovered petroleum by a quality characteristic selected from the group consisting of TAN reduction, lower sulfur content, higher API, lower viscosity, improved emulsion characteristics, reduction in heavy metal content, and combinations thereof.

5. The method of claim 1, wherein the providing of the foam into the mature chamber comprises injecting foam or a foaming agent into the mature chamber through the injection well.

6. The method of claim 1, wherein the providing of the foam into the mature chamber comprises injecting the foam into the mature chamber through a third well, wherein the third well is: (a) not the injection well, (b) not the production well, and (c) in an interconnected system with the injection well and the production well.

7. The method of claim 1, wherein the blowdown operations further comprise injecting a non-condensable gas.

8. The method of claim 1, wherein the blowdown operations do not comprise injecting a non-condensable gas.

9. The method of claim 1, further comprising generating the foam at a surface location before providing the foam into the mature chamber.

10. The method of claim 1, further comprising generating the foam sub-surface.

11. The method of claim 10, wherein the step of generating the foam sub-surface is selected from the group consisting of generating foam with a downhole static mixer, foam generation through a perforation in the well, natural mixing in the well, in situ foam generation in the formation, temperature dependent foam generation, time delayed foam generation, chemical/oil saturation dependent foam generation, and combinations thereof.

12. The method of claim 1, wherein the step of providing the foam into the mature chamber comprises injecting a solution comprising a foaming agent and generating the foam in situ in the mature chamber.

13. The method of claim 1, wherein the step of providing the foam into the mature chamber comprises injecting hot water mixed with a foaming agent selected from the group consisting of surfactants, alkali, colloidal foams, aerosols, hydrosols, emulsions, dispersions, and combinations thereof.

14. The method of claim 1, wherein the foam is formed from a foaming agent selected from the group consisting of alkyl benzene (aromatic) sulfonates, alpha/internal olefin sulfonates, alkyl aryl sulfonates, alkoxy sulfates, alkaline metal carbonates, bicarbonates, hydroxides, sodium carbonate, sodium bicarbonate, sodium hydroxide, potassium carbonate, potassium bicarbonate, potassium hydroxide, magnesium carbonate, calcium carbonate, sodium metaborate, and combinations thereof.

15. The method of claim 1, wherein the foam is formed from a foaming agent selected from the group consisting of alpha olefin sulfonates, toluene based chemicals, benzene based chemicals, and combinations thereof.

16. The method of claim 15, where in the alpha olefin sulfonates are C10 to C30 alpha olefin sulfonates.

17. The method of claim 1, wherein the foam has a low density between about 0.0006 g/cm$^3$ and about 0.0770 g/cm$^3$.

18. The method of claim 1, wherein the blowdown operations further comprising heat scavenging with said foam.

19. The method of claim 1, wherein the foam displaces trapped heavy hydrocarbons and drives the heavy hydrocarbons to a condensation front or drainage interface of the mature chamber.

20. The method of claim 1, wherein the step of providing the foam into the mature chamber at said maintained pressure provides for a second steam-assisted gravity drainage process to be maintained at a higher pressures than said maintained pressure in a second steam chamber adjacent to the mature chamber in a system of wells that are in communication, resulting in improved recovery and thermal efficiency of the second chamber.

21. The method of claim 1, wherein the foam in the mature chamber improves recovery of the second fluid.

22. A system for recovering petroleum from a formation containing heavy hydrocarbons, wherein the system comprises:
a) an injection well;
b) a production well, wherein the injection well and the production well are in fluid communication with the formation;
c) a mature chamber in the formation, wherein:
i) the mature chamber was formed by an enhanced oil recovery process until economic recovery can no longer be achieved with said enhanced oil recovery process, and
ii) the mature chamber is in blowdown operations when the enhanced oil recovery process is ceased; and
d) a foam provided in the mature chamber, wherein the foam in the mature chamber maintains pressure of the mature chamber and improves recovery of heavy hydrocarbons.

23. The system of claim 22, wherein the enhanced oil recovery process is selected from the group consisting of steam injection with (a) cyclic steam stimulation (CSS), (b) steam flooding, (c) steam-assisted gravity drainage (SAGD), (d) vapor extraction (V APEX), (e) single well SAGD (SW-SAGD), (f) cross well SAGD (X-SAGD), (g) foam assisted SAGD (FA-SAGD), (h) chemical recovery methods, (i) alkali flooding, j) surfactant flooding, (k) solvent flooding, (l) miscible flooding, (m) in situ combustion (ISC), (n) toe-heel air injection (THAI), (o) combustion overhead gravity drainage (COGD), and (p) combinations thereof.

24. The system of claim 22, wherein the enhanced oil recovery process is a thermal recovery process.

25. The system of claim 22, wherein the foam in the mature chamber fills void space within the mature chamber, maintains or increases pressure in the mature chamber, maintains saturation temperature of water existing within the mature chamber, and improves production rates of the heavy hydrocarbons during the blowdown operations.

26. The system of claim 22, wherein the system further comprises:
(a) a second injection well;
(b) a second production well, wherein the second injection well and the second production well are in fluid communication with the formation;
(c) a second chamber in the formation, wherein:
(i) the second chamber was formed from a fluid injected into the formation through the second injection well with a second enhanced oil recovery process,
(ii) the second chamber is adjacent or neighboring the mature chamber, and
(iii) the foam in said second chamber provides for the second enhanced oil recovery process to be maintained at higher pressures in the second chamber, resulting in improved recovery and thermal efficiency of the second chamber.

27. The system of claim 26, wherein the first enhanced oil recovery process and the second enhanced oil recovery process are the same type of enhanced oil recovery process.

28. A method for recovering petroleum from a formation containing heavy hydrocarbons, wherein an injection well and a production well are in fluid communication with the formation, and wherein the method comprises:
(a) injecting steam into the formation through the injection well in an enhanced oil recovery process to form a steam chamber in the formation;
(b) recovering a fluid comprising heavy hydrocarbons from the production well with said enhanced oil recovery process;
(c) forming a mature chamber from the steam chamber with said enhanced oil recovery process, whereby economic production is no longer achievable with said enhanced oil recovery process;
(d) engaging in a blowdown operation after the formation of the mature chamber, wherein:
the blowdown operation comprises ceasing said injecting steam and said enhanced oil recovery process and instead providing a foam in the mature chamber, so that the foam in the mature chamber maintains pressure of the mature chamber; and
(e) recovering the fluid comprising heavy hydrocarbons during the blowdown operation.

29. The method of claim 28, further comprising:
(a) selecting a transition condition for transitioning from the method before the step of engaging in the blowdown operation to the step of engaging in the blowdown operation;
(b) determining when the transition condition has been met; and
(c) upon determination that the transition condition has been met, transitioning to the step of engaging in the blowdown operation.

30. The method of claim 29, wherein the transition condition is selected from the group consisting of vapor chamber growth, production performance, a pre-selected pressure below native reservoir pressure of the formation, a pre-selected pressure of an adjacent formation, a pressure below a pre-selected pressure of the formation, an environmental factor, a market condition, production costs, material costs, market price for hydrocarbons, the market price for solvents, and combinations thereof.

* * * * *